April 21, 1931.  H. CAMINEZ  1,801,953
ENGINE CASE BREATHER VALVE
Filed March 1, 1928
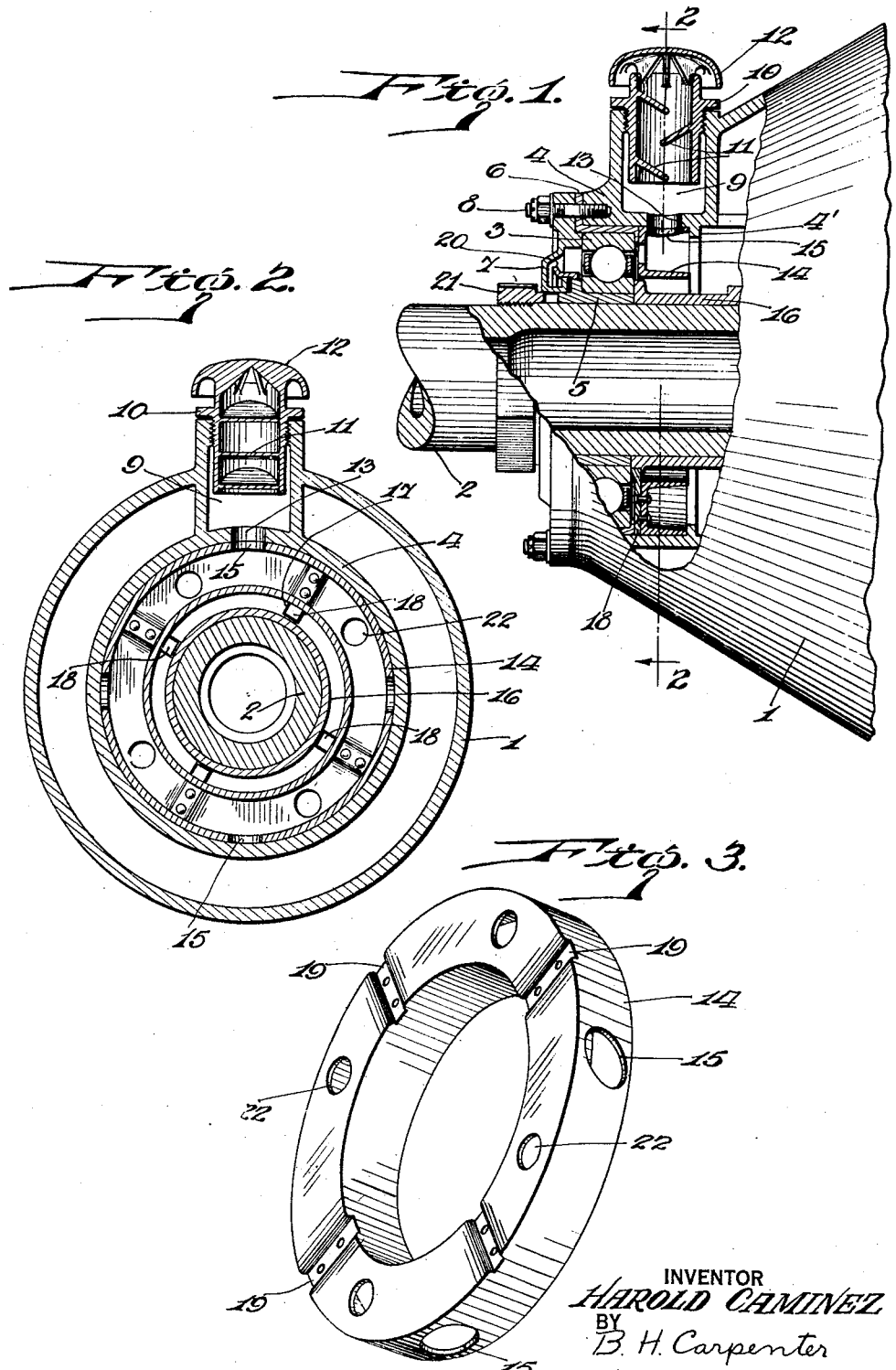
INVENTOR
HAROLD CAMINEZ
BY
B. H. Carpenter
his ATTORNEY Patented Apr. 21, 1931

1,801,953

UNITED STATES PATENT OFFICE

HAROLD CAMINEZ, OF GARDEN CITY, NEW YORK, ASSIGNOR TO FAIRCHILD-CAMINEZ ENGINE CORPORATION, OF NEW YORK, N. Y., A CORPORATION OF NEW YORK

ENGINE-CASE BREATHER VALVE

Application filed March 1, 1928. Serial No. 258,232.

This invention relates to internal combustion engines in general and more specifically relates to means for preventing oil leakage from the engine case.

In internal combustion engines there is a tendency for the oil to creep along the bearings of the main shaft and also through various other crevices to the outside of the engine. The leakage along the main shaft is particularly prevalent in engines employing ball or roller bearing for the main shaft. This oil leakage is not only wasteful but obnoxious especially in aircraft due to the fire hazard from the leaking oil, as well as the rapid deterioration of the airplane produced by the oil spray.

It is the object of this invention to provide means for preventing the oil leakage. The method provided in this invention is dependent upon the fact that in multiple cylinder reciprocating engines the velocity of the various pistons is such that periods of compression and rarefaction exist within the engine case. The device of this invention provides a means for closing the engine case during periods of rarefaction and opening the engine case to the atmosphere during periods of compression. In this way the tendency of the compression to force the oil thru the crevices and the engine bearing is reduced to a minimum and the rarefaction periods are utilized to draw back into the engine case the oil seeking to escape through the bearings or through the crevices. It is obvious that a device of this invention will also reduce oil pumping to a minimum.

Other objects and advantages of this invention will become apparent from the following specification, claims and appended drawings, in which:—

Fig. 1 represents a vertical longitudinal view, partly in section of the rotary valve.

Fig. 2 is a vertical transverse section taken on the line 2—2 of Fig. 1 and viewed in the direction of the arrows.

Fig. 3 is a perspective view of the rotary valve member.

Referring to Fig. 1 of the drawings, 1 represents the engine case of an internal combustion engine similar to that shown in United States Patent No. 1,594,045 granted July 27, 1926 to Harold Caminez, but it is to be understood, of course, that the use of the invention now to be described is not limited to the engine disclosed in the patent here referred to but it may be used on other types as well.

The numeral 2 represents the main shaft of the engine which is supported by a ball bearing 3 supported in a housing 4 carried by the end of the engine case 1. A sleeve 5 is carried by the shaft 2 and is interposed between the shaft 2 and the inner ball race of the ball bearing 3, the sleeve 5 being provided with a flange at its left end, Fig. 1, for preventing the bearing 3 from shifting toward the left.

Formed within the housing 4 is a cylindrical chamber concentric with shaft 2. A flanged sleeve or bushing 6, is mounted in the cylindrical chamber, one flange of the sleeve bearing against the left end of the housing 4 while the other flange serves to prevent the outer ball race of the ball bearing 3 from shifting to the right, Fig. 1. A disc or end piece 7, provided with an opening for shaft 2, Fig. 1, is fastened to the housing 4 by means of screws or studs 8 which also pass through holes in the left of sleeve 6. The end piece 7 and sleeve 6 are by this means securely mounted on the housing 4. The end member 7 is provided with an annular flange which abuts against the outer side of the outer ball race 3 and securely holds said race in position against the inner flange of the member 6.

Above the housing 4 and the cylindrical chamber formed therein is a chamber 9 case integral with the engine case 1. The chamber 9 is provided with a cap piece 10 which is screwed within the chamber 9. The cap piece 10 is substantially hollow and is provided with baffle plates 11 which may be cast integral with the cap piece 10. A hood portion 12 formed as part of the cap piece prevents dirt from entering the chamber 9. The cap piece and hood being so constructed that air may freely pass out through the cap piece from the chamber 9.

The chamber 9 is provided with an opening 13 into the cylindrical chamber formed within the housing 4 which has been already referred to.

Fitting within the cylindrical chamber in housing 4 and just to the right, Fig. 1, of bearing 3, is a rotary valve member 14 which fits smoothly so as to be free to rotate within the chamber as a bearing. The valve member 14 is provided with an opening or openings 15 cooperating with the opening 13. As many openings 15 are provided as there are periods of compression in the engine case per revolution of the main shaft 2. Mounted on and integral with shaft 2 is a flanged sleeve 16 which is provided with notches 17 in the flange. The flange of the sleeve 16 bears against the inner ball race of bearing 3 and prevents shifting of the race axially to the right Fig. 1.

Splines 18, fitted within grooves 19 in rotary member 14, also fit in notches 17 in flange of sleeve 16. The rotary valve member 14 is thus constrained to rotate with shaft 2 so as to bring successive openings 15 into alinement with the opening 13 in chamber 9. The valve member 14 is prevented for axial movement along the shaft 2 in the direction to the left of Fig. 1 by the inner flange of the member 6 and is prevented from movement to the right along shaft 2 as viewed in Fig. 1 by an inwardly projection annular flange 4' within the cylindrical chamber. Running clearance is allowed the valve member 14 in all directions.

The end piece 7 has the general shape in section shown in Fig. 1 and fits smoothly over the sleeve 5 as shown. An oil throwing ring 20 is fitted on the inner flange of end piece 7 and serves to throw off oil which may leak through the bearing 3 and prevent the oil from following along the shaft 2. A ring 21 which is threaded to shaft 2 and provided with a packing further serves to prevent oil leakage through the bearing. The rotary member 14 is provided with holes 22 which permits oil to pass from the main part of the engine case through to the bearing 3 for lubrication purposes.

The rotary valve member 14 is so mounted with respect to the shaft 2 that each time a compression occurs, one of the openings 15 will be in alinement with the opening 13 in chamber 9. The compression will thus be relieved. When a rarefaction occurs openings 15 will be out of alinement with opening 13 so that a vacuum will be produced in the engine case which will tend to draw any oil working out through bearing 3 or through crevices back into the engine case.

From the foregoing description and the accompanying drawings it will be obvious that the invention just described by eliminating oil leakage reduces the fire hazard and deterioration caused by such leakage and at the same time decreases the oil consumption.

Various changes in the construction of the embodiment illustrated in the drawings may be made without departing from the spirit of the invention, and I do not therefore, desire to limit myself to the specific construction shown and described, but to interpret the invention broadly within the scope of the appended claims.

What I claim as my invention is:

1. The combination with an engine having an engine case, a main shaft and a plurality of reciprocating pistons so reciprocating as to produce periods of compression within said engine case, of a valve seated in an integral part of said case and carried by said shaft for opening said engine case to the atmosphere during said periods of compression.

2. The combination with an engine having an engine case, a main shaft, and a plurality of reciprocating pistons so reciprocating as to produce periods of compression and rarefaction within said engine case, of a valve seated in an integral part of said casing and carried by said shaft in said engine case, and means for closing said valve during periods of rarefaction and opening said valve during periods of compression.

3. The combination with an engine having an engine case, a main shaft mounted in said engine case and extending therefrom and rotated by a plurality of reciprocating pistons so reciprocating as to produce periods of compression within said engine case, of a valve mechanism seated in an integral part of said case and mounted on said shaft and operated thereby for opening said engine case to the atmosphere during the periods of compression in said case to prevent oil leakage adjacent the main shaft and through crevices.

4. The combination with an engine having an engine case, a main shaft mounted in said engine case and extending therefrom and rotated by a plurality of reciprocating pistons so reciprocating as to produce periods of compression and rarefaction within said engine case, of a valve mechanism seated in an integral part of said case and carried by said shaft and operated thereby for opening said engine case to the atmosphere during periods of compression in said case and closing said case during periods of rarefaction for preventing oil leakage adjacent said shaft and through crevices.

5. In a device of the class described, an engine case, a shaft mounted in said engine case, a cylindrical chamber concentric with shaft and opening into said engine case, an engine breather formed with an opening communicating between said chamber and the outside atmosphere, and a valve member seated in an integral part of said case and mounted within said chamber and operatively connected with said shaft for rotation thereby for opening and closing said breather opening.

6. In a device of the class described, an engine case, a shaft mounted in said engine case, a cylindrical chamber concentric with shaft and opening into said engine case, an engine breather formed with an opening communicating between said chamber and the outside atmosphere, and a valve member seated in an integral part of said case and mounted within said chamber and directly and operatively connected with said shaft for rotation thereby for opening and closing said breather opening.

In testimony whereof I affix my signature.

HAROLD CAMINEZ.